United States Patent
Lee et al.

(10) Patent No.: US 11,012,170 B2
(45) Date of Patent: May 18, 2021

(54) METHOD AND APPARATUS FOR MEASURING INTERFERENCE AMOUNT

(71) Applicant: SAMSUNG ELECTRONICS CO., LTD., Gyeonggi-do (KR)

(72) Inventors: Ikbeom Lee, Gyeonggi-do (KR); Chongdon Kim, Gyeonggi-do (KR); Youngtaek Bae, Gyeonggi-do (KR); Hayoung Yang, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 16/979,307

(22) PCT Filed: Feb. 14, 2019

(86) PCT No.: PCT/KR2019/001807
§ 371 (c)(1),
(2) Date: Sep. 9, 2020

(87) PCT Pub. No.: WO2019/172547
PCT Pub. Date: Sep. 12, 2019

(65) Prior Publication Data
US 2021/0058172 A1 Feb. 25, 2021

(30) Foreign Application Priority Data
Mar. 9, 2018 (KR) .................. 10-2018-0027953

(51) Int. Cl.
*H04B 17/327* (2015.01)
*H04B 17/345* (2015.01)
(Continued)

(52) U.S. Cl.
CPC ......... *H04B 17/345* (2015.01); *H04B 7/0615* (2013.01); *H04B 17/327* (2015.01); *H04B 7/0413* (2013.01)

(58) Field of Classification Search
CPC ...... H04L 2025/03426; H04W 72/082; H04W 72/085; H04W 72/1231; H04B 17/336;
(Continued)

(56) References Cited

U.S. PATENT DOCUMENTS

| 6,853,839 B2 | 2/2005 | Usuda et al. |
| 2005/0221861 A1 | 10/2005 | Zeira |

(Continued)

FOREIGN PATENT DOCUMENTS

| JP | 2007129697 | 5/2007 |
| KR | 1020100054876 | 5/2020 |

OTHER PUBLICATIONS

PCT/ISA/210 Search Report issued on PCT/KR2019/001807, dated May 27, 2019, pp. 7.

(Continued)

*Primary Examiner* — Rahel Guarino
(74) *Attorney, Agent, or Firm* — The Farrell Law Firm, P.C.

(57) ABSTRACT

The present disclosure provides a method for measuring an amount of interference from an antenna, the method comprising the operations of: receiving at least on reference symbol; calculating a reference symbol NI, which is the antenna-related noise interference (NI) in the at least one reference symbol, on the basis of the at least one reference symbol; receiving at least one data symbol; calculating a data symbol NI, which is the antenna-related NI in the data symbol, on the basis of the at least one data symbol; calculating an NI ratio of the antenna which is the ratio of the data symbol NI relative to the reference symbol NI; and determining an antenna weight of the antenna on the basis of the NI ratio.

20 Claims, 4 Drawing Sheets

(51) Int. Cl.
*H04B 7/06* (2006.01)
*H04B 7/0413* (2017.01)

(58) Field of Classification Search
CPC .. H04B 17/327; H04B 17/345; H04B 7/0426; H04B 7/04; H04B 7/0615; H04B 7/0413
See application file for complete search history.

(56) References Cited

U.S. PATENT DOCUMENTS

| | | |
|---|---|---|
| 2008/0293371 A1 | 11/2008 | Kishigami et al. |
| 2012/0115428 A1 | 5/2012 | Rudberg |
| 2013/0150040 A1 | 6/2013 | Desclos et al. |
| 2015/0092583 A1* | 4/2015 | Balraj .................. H04B 7/0639 370/252 |
| 2015/0124632 A1 | 5/2015 | Sandberg et al. |

OTHER PUBLICATIONS

PCT/ISA/237 Written Opinion issued on PCT/KR2019/001807, dated May 27, 2019, pp. 7.

* cited by examiner

METHOD AND APPARATUS FOR MEASURING INTERFERENCE AMOUNT

PRIORITY

This application is a National Phase Entry of International Application No. PCT/KR2019/001807, which was filed on Feb. 14, 2019, and claims priority to Korean Patent Application No. 10-2018-0027953 filed in the Korean Intellectual Property Office on Mar. 9, 2018, the content of each of which is incorporated herein by reference.

TECHNICAL FIELD

The disclosure relates to a method and an apparatus for measuring an interference amount, and relates to a method and an apparatus for preventing performance degradation due to a mismatch of an interference amount between a reference symbol and a data symbol.

BACKGROUND ART

To meet the demand for wireless data traffic having increased since deployment of 4G communication systems, efforts have been made to develop an improved 5G or pre-5G communication system. Therefore, the 5G or pre-5G communication system is also called a "Beyond 4G Network" or a "Post LTE System".

The 5G communication system is considered to be implemented in higher frequency (mmWave) bands, e.g., 60 GHz bands, so as to accomplish higher data rates. To decrease propagation loss of the radio waves and increase the transmission distance, beamforming, massive multiple-input multiple-output (MIMO), full dimensional MIMO (FD-MIMO), array antennas, analog beam forming, and large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving networks, cooperative communication, coordinated multi-points (CoMP), reception-end interference cancellation, and the like.

In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed.

A reception node of a Long-Term Evolution (LTE) communication system receives data via antenna combining. In this configuration, the signal reception performance of the reception node may be degraded due to a noise component or an interference component included in a signal received by the reception node.

DETAILED DESCRIPTION OF THE INVENTION

Technical Problem

The disclosure makes it possible to determine an antenna weight in consideration of both an interference amount in a reference symbol and an interference amount in a data symbol, thus improving accuracy in receiving a signal by using antenna combining.

The disclosure makes it possible to prevent performance degradation due to a mismatch of an NI component between a data symbol and a reference symbol, thus allowing an improvement in reception performance of a reception node.

The disclosure makes it possible to separately determine an on/off operation of each antenna for each symbol, thus allowing an improvement in symbol-based reception performance.

Technical Solution

In accordance with an aspect of the disclosure, there is provided a method for measuring an interference amount of an antenna, the method including: receiving a signal on a reference symbol; calculating a reference symbol Noise Interference (NI) which is NI in the reference symbol of the antenna, based on the signal received on the reference symbol; receiving signals on one or more data symbols; calculating a data symbol NI which is NI in the data symbol of the antenna, based on the signals received on the one or more data symbols; calculating an NI ratio of the antenna which is a ratio of the data symbol NI relative to the reference symbol NI; and determining an antenna weight of the antenna based on the NI ratio.

The disclosure provides the method, wherein the calculating of the data symbol NI includes: measuring respective data symbol-specific NIs in the one or more data symbols based on the signals received on the one or more respective data symbols; and calculating, as the data symbol N, an average value of the data symbol-specific NIs in the one or more data symbols.

The disclosure provides the method, wherein the average value of the data symbol-specific NIs corresponds to a value calculated as an average of n data symbol-specific NIs selected in descending order of NI values among the one or more data symbol-specific NIs measured in the one or more data symbols.

The disclosure provides the method, wherein the signals received on the one or more data symbols are received in an unallocated Resource Block (RB) domain.

According to the disclosure, the method further includes calculating powers of the signals, received in the unallocated RB domain, in units of frequency tones, wherein the data symbol NI is calculated based on an average of the powers of the signals calculated in units of frequency tones.

The disclosure provides the method, wherein the data symbol NI is measured in a unit of four RBs.

The disclosure provides the method, wherein the NI ratio of the antenna is calculated for each of the one or more data symbols.

The disclosure provides the method, wherein the antenna weight is determined by comparing the calculated NI ratio with a threshold.

The disclosure provides the method, wherein on or off of the antenna is determined based on a result of comparing the calculated NI ratio with the threshold.

The disclosure provides the method, wherein the antenna weight is determined for each of the one or more data symbols.

In accordance with another aspect of the disclosure, there is provided an apparatus for measuring an interference amount, the apparatus including: a transceiver configured to receive a signal on each of a reference symbol and one or more data symbols; and a processor configured to calculate a reference symbol Noise Interference (NI), which is NI in the reference symbol of an antenna, based on the signal received on the reference symbol, calculate a data symbol NI, which is NI in the data symbol of the antenna, based on the signals received on the one or more data symbols, calculate an NI ratio of the antenna which is a ratio of the data symbol NI relative to the reference symbol NI, and determine an antenna weight of the antenna based on the NI ratio.

Advantageous Effects

An embodiment of the disclosure makes it possible to determine an antenna weight in consideration of both an interference amount in a reference symbol and an interference amount in a data symbol, thus improving accuracy in receiving a signal by using antenna combining.

An embodiment of the disclosure makes it possible to prevent performance degradation due to a mismatch of an NI component between a data symbol and a reference symbol, thus improving reception performance of a reception node.

An embodiment of the disclosure makes it possible to separately determine an on/off operation of each antenna for each symbol, thus improving symbol-based reception performance.

MODE FOR CARRYING OUT THE INVENTION

Figure 1A:
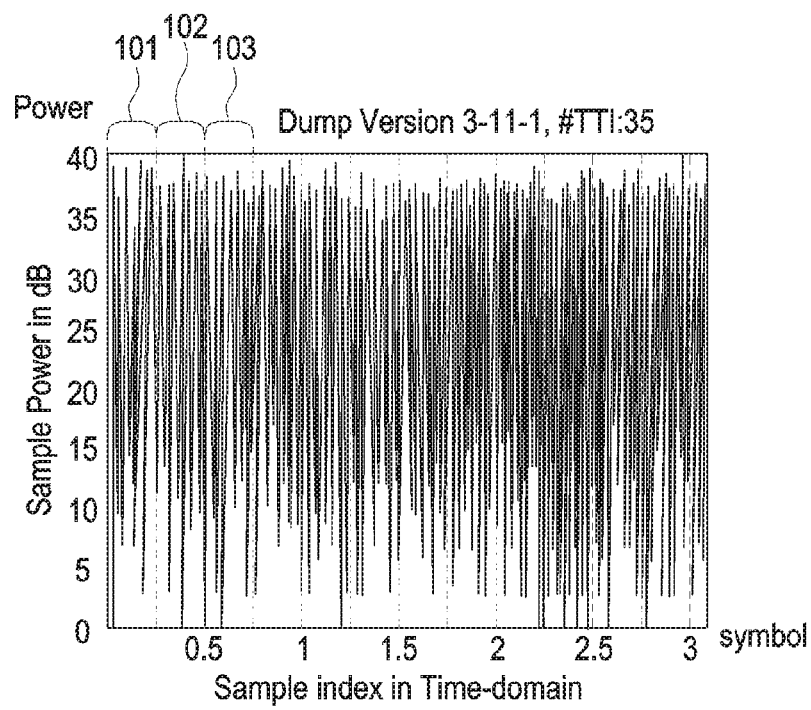
FIG. 1A is a view illustrating an example of received signal power according to symbols in each antenna used for antenna combining.

Hereinafter, embodiments of the disclosure will be described in detail in conjunction with the accompanying drawings. In the following description of the disclosure, a detailed description of known functions or configurations incorporated herein will be omitted when it may make the subject matter of the disclosure rather unclear. The terms which will be described below are terms defined in consideration of the functions in the disclosure, and may be different according to users, intentions of the users, or customs. Therefore, the definitions of the terms should be made based on the contents throughout the specification.

Prior to a detailed description of the disclosure, examples of interpretable meanings of several terms used in the specification will be provided. However, it should be noted that the terms are not limited to the interpretation examples provided below.

A base station is a main agent that communicates with a terminal, and may be referred to as a "BS", a "NodeB (NB)", an "eNodeB (eNB)", an "Access Point (AP)", or the like.

A terminal is a main agent that communicates with a base station, and may be referred to as a "User Equipment (UE)", a "Mobile Station (MS)", a "Mobile Equipment (ME)", a "device", a "massive Machine-Type Communication (mMTC) device", a "low-cost device", a "low-complexity device", or the like.

A desired signal refers to a signal which is desired to be received by a reception node among signals transmitted by a transmission node, and may be referred to as a "target signal". An interference signal refers to a signal which is not the desired signal among the signals received by the reception node. Accordingly, a received signal may include a desired signal and an interference signal.

An LTE reception node may receive the same signal via multiple antennas, and may perform antenna combining in which a desired signal is derived by combining respective signal reception results of the multiple antennas.

An LTE reception node (e.g., a base station) performs antenna combining in consideration of only a Noise Interference (NI) component of a Reference Symbol or Reference Signal (RS).

A reference symbol according to an embodiment may refer to a symbol on which a reference signal is received.

That is, when performing antenna combining, according to an NI component of a measured reference symbol, the LTE reception node may derive a desired signal by configuring different reflection importances for respective signals received via multiple antennas in combining signal reception results of the antennas. In antenna combining, a reflection importance of a signal received via an individual antenna may be referred to as an "antenna weight".

As described above, performing, by a general LTE reception node, antenna combining in consideration of only an NI component of a reference symbol has a premise that an interference amount of a Data Symbol or Data Signal (DS) is similar to an interference amount of a reference symbol.

Specifically, when there are N reception antennas, reception signals received on reference symbols of antenna 0 to antenna N−1 may be represented by $$Y_k(t,f) = h_k(t,f) * s(f) + n_k(t,f).$$

As variables of the reception signal $Y_k(t,f)$, $h(t,f)$ represents a channel component of a symbol t and a frequency tone f, $s(f)$ represents a component of a Demodulation Reference Signal (DMRS) transmitted on a frequency tone f, and $n_k(t,f)$ represents an NI component of a symbol t and a frequency tone f. In this example, k represents an antenna index.

Since a reception signal received on a reference symbol of each antenna is $Y_k(t,f)$, if a channel estimation component of each antenna is $h_k^{est}(t,f)$, an NI component in a reference symbol of each antenna k may be estimated as in Equation 1 below.

$$n_k^{est}(t,f) = Y_k(t,f) - h_k^{est}(t,f) * s(f) \quad \text{[Equation 1]}$$

The LTE reception node may determine an NI component of each antenna and determine an antenna weight of each antenna, only by deriving an NI component of a reference symbol by using Equation 1.

However, an NI component related to each antenna may include not only an NI component in a reference symbol but also an NI component in a data symbol.

Accordingly, if an NI component in a data symbol is equal to an NI component in a reference symbol (i.e., $n_k^{est}(t,f)$ in Equation 1), even when an NI component related to each antenna is estimated based on only the NI component measured in the reference symbol (i.e., $n_k^{est}(t,f)$ in Equation 1) as in Equation 1, a large error may not occur. However, when a difference between an NI component in a data symbol and an NI component in a reference symbol is large, an error occurs in the NI component related to the antenna calculated by Equation 1 in consideration of only the NI component in the reference symbol.

That is, if an NI component in a data symbol is different from an NI component in a reference symbol, when an NI component related to an antenna is determined by Equation 1, an error occurs in an NI component in a data symbol of the antenna, and thus a weight of the antenna may not be accurately calculated.

Accordingly, when antenna combining is performed based on only an NI component in a reference symbol, the performance of signal reception may be degraded.

A reception node of a multi-transmission/reception antenna (Multiple-Input Multiple-Output (MIMO)) system may estimate a channel state, and thus may use a Minimum Mean-Squared Error (MMSE) method for removing an interference component of a signal received via each of multiple antennas. However, when the MMSE method is performed in consideration of only an NI component in a reference symbol, if NI power entering a data symbol is significantly larger than NI power entering a reference symbol, an error occurs in an antenna combining operation employing the MMSE method.

Figure 1B:
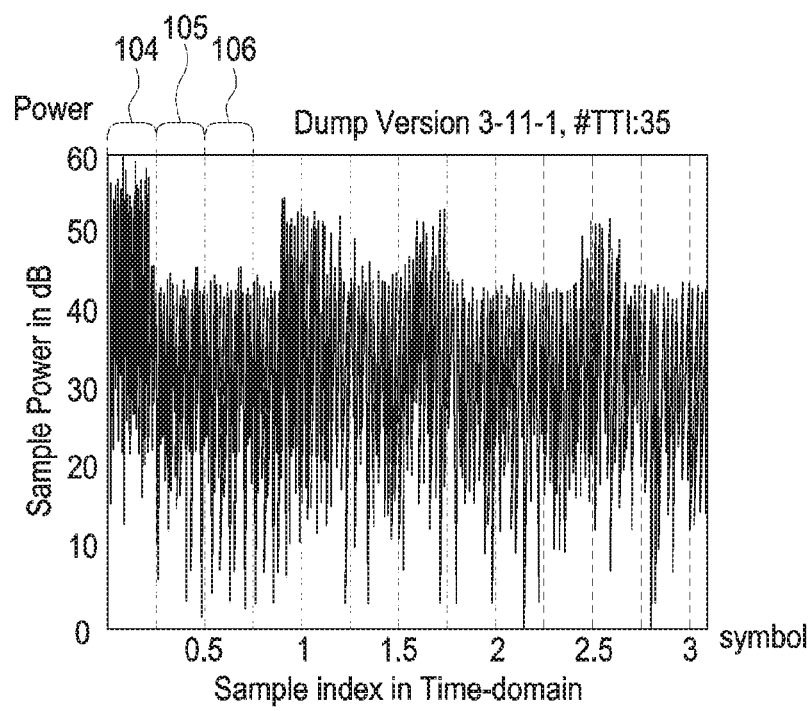
FIG. 1B is a view illustrating an example of received signal power according to symbols in each antenna used for antenna combining.

FIG. 1A is a view illustrating an example of received signal power according to symbols in each antenna used for antenna combining, and FIG. 1B is a view illustrating an example of received signal power according to symbols in each antenna used for antenna combining.

Referring to a graph of FIG. 1A and a graph of FIG. 1B, in each of the graph of FIG. 1A and the graph of FIG. 1B, a horizontal axis is divided at predetermined intervals, and each of periods 101 to 106 divided at the predetermined intervals on the horizontal axis represents one symbol. Further, in each of the graph of FIG. 1A and the graph of FIG. 1B, a vertical axis represents power received on each symbol.

FIG. 1A illustrates a received signal power spectrum of Antenna (Ant) 0 among antennas used for antenna combining.

In FIG. 1A, a signal received on each of the symbols 101, 102, and 103 of antenna 0 is illustrated as having predetermined power. That is, in the case of antenna 0, it can be noted that a signal having fixed power is received on each symbol.

Meanwhile, FIG. 1B illustrates a received signal power spectrum of antenna 1 among the antennas used for antenna combining.

In FIG. 1B, signals received on the respective symbols 104, 105, and 106 of antenna 1 are illustrated as having different powers. In particular, received signal power of the particular data symbol 104 of antenna 1 illustrated in FIG. 1B is significantly different from received signal powers of the other symbols 105 and 106.

Since an LTE signal has a characteristic that there is almost no difference of received powers between symbols, it can be noted that a power difference between the received signals measured in antenna 1 illustrated in FIG. 1B is caused by an NI component in a particular symbol.

Accordingly, it can be noted that a reason why power measured in the particular data symbol 104 of FIG. 1B is larger than powers measured in the other symbols 105 and 106 is because an NI component in the particular data symbol 104 is large.

As described above, when reference symbol-based antenna combining is performed, a weight of each antenna is determined by reflecting only NI in a reference symbol without regard to NI in data symbols.

Accordingly, even when large NI exists in the particular symbol 104 of antenna 1 illustrated in FIG. 1B, a weight of an antenna is determined without considering an NI component included in the data symbol 104, and thus there occurs performance degradation caused by failing to null NI in the data symbol 104.

Therefore, it is necessary to improve reception performance by preventing the above-described performance degradation due to a mismatch of an NI component between a data symbol and a reference symbol.

The disclosure provides a method for considering, by a reception node, not only an NI component in a reference symbol but also an NI component in a data symbol in order to improve reception performance in signal reception using antenna combining.

Hereinafter, an interference amount measurement method and apparatus for improving reception performance according to an embodiment of the disclosure will be described with reference to FIG. 2, FIG. 3, FIG. 4, and FIG. 5.

Figure 2:
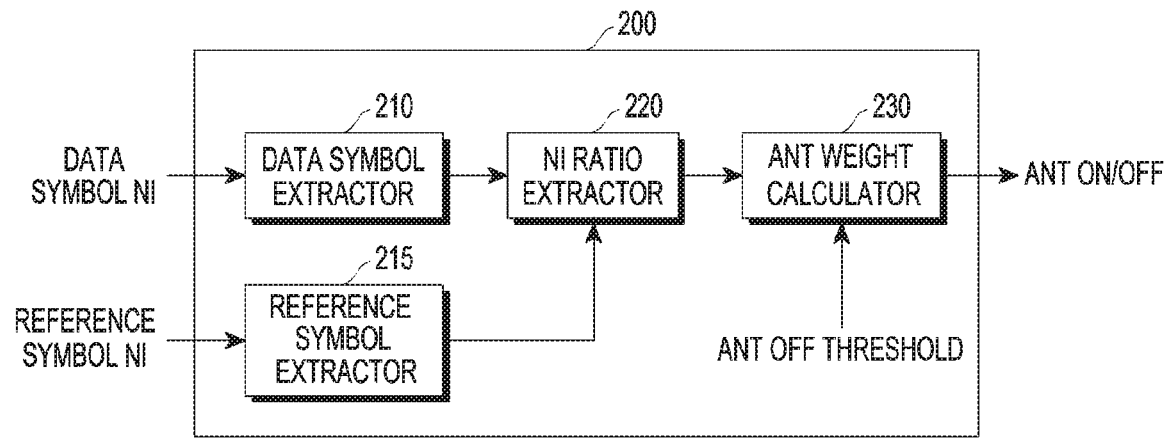
FIG. 2 is a diagram illustrating a configuration of an interference amount measurement apparatus according to an embodiment of the disclosure.

FIG. 2 is a diagram illustrating a configuration of an interference amount measurement apparatus 200 according to an embodiment of the disclosure.

The interference amount measurement apparatus 200 of FIG. 2 according to an embodiment of the disclosure may be included in a reception node that receives a signal.

Referring to FIG. 2, the interference amount measurement apparatus 200 according to an embodiment of the disclosure may include a data symbol extractor 210, a reference symbol extractor 215, an NI ratio calculator 220, and an Ant weight calculator 230.

The data symbol extractor 210 according to an embodiment may be configured to calculate power of a signal received on each of one or more data symbols and estimate NI in each data symbol.

According to an embodiment of the disclosure, NI in a data symbol may be measured by utilizing an unallocated Resource Block (RB).

For example, an estimation of NI in a Physical Uplink Shared Channel (PUSCH) data symbol may be performed in a vacant frequency domain (hereinafter, in the disclosure, referred to as a "vacant RB domain") to which a channel is not allocated for an uplink.

Since the vacant RB domain is a vacant frequency domain which is not allocated a channel, all powers of signals received in the vacant RB domain correspond to NI components. Accordingly, NI in a data symbol may be accurately estimated using the vacant RB domain.

An estimation of NI in a data symbol according to an embodiment may be calculated in a unit of RB; received signal power may be calculated in a unit of frequency tone in a vacant RB domain; and NI in a data symbol for each RB may be calculated by averaging the calculated received signal power in the unit of frequency tone. In this example, each RB may include 12 frequency tones.

According to an embodiment of the disclosure, an NI component in a data symbol of each antenna in a vacant RB may be calculated by Equation 2 below.

$$NI(RB) = \sum_{f=index_{RB}*12}^{(index_{RB}+1)*12-1} |Y_f|^2/12 \quad \text{[Equation 2]}$$

In Equation 2, NI(RB) represents NI in each RB, and $index_{RB}$ represents an index of each RB. Further, f corresponds to a frequency tone, and $Y_f$ corresponds to a received signal component for each frequency tone.

As described above, each RB may include 12 frequency tones, and thus a sum of received signal powers in units of frequency tones for one RB may be represented as a sum of received signal powers for respective frequency tones from a frequency tone of $\text{index}_{RB}*12$ to a frequency tone of $(\text{index}_{RB}+1)*12-1$.

For example, when values of 0 to 99 are configured for $\text{index}_{RB}$, NI for an RB having 0 as a value of $\text{index}_{RB}$ may be an average value obtained by adding received signal powers for 12 respective frequency tones from a frequency tone of 0 to a frequency of 11 and dividing a result of adding the received signal powers by 12.

When received signal power is calculated in a unit of frequency tone in the vacant RB domain, if the number of vacant RBs is larger than or equal to 1RB, an estimation of NI in a data symbol may be performed.

According to an embodiment, operations of the interference amount measurement apparatus 200 according to an embodiment of the disclosure may be implemented in a reception node, and the reception node may directly estimate NI in a data symbol by using a vacant RB domain, so that an antenna can be turned on or off in real time when a signal is received.

According to another embodiment of the disclosure, a virtual Sounding Reference Signal (SRS) in four RBs may be allocated in a vacant RB domain, and thus NI in a data symbol may be measured using the allocated RBs.

That is, since a virtual SRS in four RBs is allocated to a transmission node in the vacant RB domain, an NI estimation result may be calculated in a unit of 4RBs. The virtual SRS in four RBs according to an embodiment of the disclosure may be allocated to the transmission node in order to measure NI in a data symbol, but the transmission node may not transmit an SRS in the SRS in four RBs.

In this example, at least consecutive four RBs should exist in the vacant RB domain, and in the case of an estimation of NI in a data symbol of each antenna, NI in a data symbol may be calculated by a virtual SRS in four RBs and Equation 3 below.

$$NI(RB) = \sum_{f=\text{index}_{RB}*6}^{(\text{index}_{RB}+4)*6-1} |Y_f - \hat{h}_f S_f|^2 /24 \quad \text{[Equation 3]}$$

In Equation 3, NI(RB) represents NI in each RB, and $\text{index}_{RB}$ represents an index of each RB. Further, f corresponds to a frequency tone, $Y_f$ corresponds to a received signal component for each frequency tone, $S_f$ corresponds to a transmission signal component in each frequency tone, and $\hat{h}_f$ corresponds to a channel estimation component in each frequency tone.

In the case of an SRS, one RB may include 6 frequency tones. Accordingly, an SRS in four RBs may include 24 frequency tones.

NI for each RB may be an average value calculated by dividing a sum of NIs in respective frequency tones included in an SRS in four RBs by the total number of frequency tones, that is, 24.

In an example in which $\text{index}_{RB}$ is 0, in relation to an SRS in four RBs, NI for each RB may be calculated with reference to frequency tones included in a total of four RBs from an RB corresponding to an RB index of 0 to an RB corresponding to an RB index of 3.

Specifically, NI for each RB may be calculated by adding NIs in respective frequency tones from frequency tone 0 included in an RB having an index of 0 to frequency tone 23 included in an RB having an index of 3 and dividing a result of adding the NIs by 24 which is the total number of frequency tones.

In Equation 3, $\hat{h}_f$ represents a channel estimation component in each frequency tone, and since the transmission node does not transmit a signal in the allocated virtual SRS in four RBs as described above, $\hat{h}_f$ should be 0 in an ideal case.

However, when $\hat{h}_f$ includes a part of an interference component and accordingly, the channel estimation component $\hat{h}_f$ is not 0, NI in a data symbol may be measured to be smaller than an actual NI value (may be underestimated). In this regard, an error included in $\hat{h}_f$ as an interference component has a value which is insignificant compared to an error between NI in a data symbol and NI in a reference symbol, and thus does not significantly affect recognition of a difference between the NI in the data symbol and the NI in the reference symbol.

The data symbol extractor 210 according to an embodiment may determine n data symbol NIs having larger magnitudes in descending order of magnitudes among the NIs in the one or more respective data symbols measured in units of respective RBs, and thus may calculate an average of the n data symbol NIs.

The reference symbol extractor 215 according to an embodiment of the disclosure may calculate an average value of NIs in m reference symbols measured using powers of signals received on the m respective reference symbols.

The NI ratio calculator 220 according to an embodiment may receive the average of the NIs in the data symbols calculated by the data symbol extractor 210 and the average of the NIs in the reference symbols calculated by the reference symbol extractor 215, and thus may calculate an NI ratio of a particular antenna which is a ratio of a data symbol NI relative to a reference symbol NI in the antenna.

The NI ratio calculator 220 may calculate an NI ratio of the antenna by using Equation 4 below.

$$\text{Ratio\_NI} = \frac{\text{Avg\_NI\_DS}}{\text{Avg\_NI\_RS}} \quad \text{[Equation 4]}$$

In Equation 4, Ratio_NI represents the NI ratio of the antenna, Avg_NI_RS represents the average of the reference symbol NIs calculated by the reference symbol extractor 215, and Avg_NI_DS represents the average of the data symbol NIs calculated by the data symbol extractor 210.

The Ant weight calculator 230 according to an embodiment of the disclosure may receive the NI ratio calculated by the NI ratio calculator 220, and may determine whether to perform an on/off operation of a corresponding antenna for each antenna, based on the NI ratio.

According to an embodiment, the Ant weight calculator 230 may determine an on/off operation of an antenna by comparing the NI ratio with a preset Ant off threshold, and the Ant off threshold corresponds to a threshold for turning off the corresponding antenna.

The Ant weight calculator 230 may determine on/off of the antenna via the process shown in Table 1 below.

TABLE 1

IF (Ratio_NI > TH_AntOff))
    int AntOnOff = 0(Off);

TABLE 1-continued

```
        ELSE
            int AntOnOff = 1(On);
        END
```

Referring to Table 1, if an NI ratio of an antenna is larger than the Ant off threshold, the Ant weight calculator 230 determines an off operation of the antenna, but if the NI ratio of the antenna is smaller than the Ant off threshold, determines an on operation of the antenna.

According to another embodiment of the disclosure, an on/off operation of each antenna may be determined for each data symbol.

Specifically, an NI ratio may be calculated for each data symbol, the NI ratio for each data symbol may be compared with the Ant off threshold, and thus on/off of an antenna for each symbol may be determined.

In this configuration, an NI ratio for each data symbol may be calculated by Equation 5 below.

$$\text{Ratio\_NI\_Symbol} = \frac{\text{NI\_DS(Symbol)}}{\text{Avg\_NI\_RS}} \quad \text{[Equation 5]}$$

In Equation 5, Ratio_NI_Symbol represents an NI ratio in a particular data symbol of a corresponding antenna, Avg_NI_RS represents the reference symbol NI average calculated by the reference symbol extractor 215, and NI_DS(Symbol) represents the NI in the corresponding data symbol calculated by the data symbol extractor 210.

When on/off of an antenna is determined for each data symbol, the Ant weight calculator 230 according to an embodiment of the disclosure may determine on/off of an antenna in a particular data symbol via the process shown in Table 2 below.

TABLE 2

```
        IF (Ratio_NI_Symbol > TH_AntOff))
            int AntOnOff(symbol) = 0(Off);
        ELSE
            int AntOnOff(symbol) = 1 (On);
        End
```

Referring to Table 2, if an NI ratio in a particular data symbol of a corresponding antenna is larger than the Ant off threshold, the Ant weight calculator 230 may determine an off operation of the antenna in the particular data symbol, but if the NI ratio in the particular data symbol is smaller than the Ant off threshold, may determine an on operation of the antenna.

According to an embodiment of the disclosure, the Ant weight calculator 230 may determine not only an on/off operation of each antenna but also an antenna weight of each antenna, based on an NI ratio of an antenna.

That is, the Ant weight calculator 230 may determine a weight of each antenna for antenna combining based on the NI ratio. In this example, if an antenna weight is equal to 0, a corresponding antenna may operate in an off-state, but if the antenna weight is not equal to 0, the corresponding antenna may operate in an on-state.

The Ant weight calculator 230 according to an embodiment may calculate an antenna weight via the process shown in Table 3 below.

TABLE 3

```
        IF (Ratio_NI_Symbol > TH_AntOff))
            int AntOnOff(symbol) = f(Ratio_NI_Symbol);
```

Referring to Table 3, the Ant weight calculator 230 may represent, as a value between 0 and 1, an NI ratio of a corresponding antenna or an NI ratio in a particular data symbol of the antenna. That is, f(Ratio_NI_Symbol) in Table 3 represents a function of mapping the NI ratio in the particular data symbol of the antenna to a value between 0 and 1.

The Ant weight calculator 230 according to an embodiment of the disclosure may determine a weight of the corresponding antenna according to the value of f(Ratio_NI_Symbol).

Figure 3:
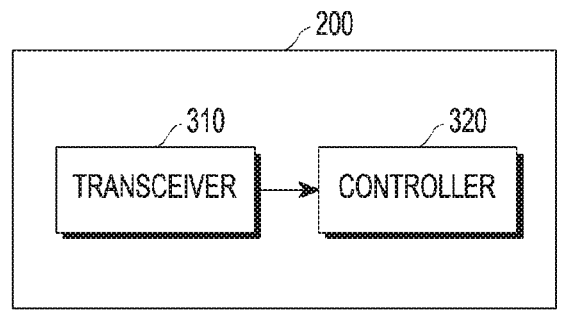
FIG. 3 is a diagram illustrating a configuration of an interference amount measurement apparatus according to another embodiment of the disclosure.

FIG. 3 is a diagram illustrating a configuration of an interference amount measurement apparatus 200 according to another embodiment of the disclosure.

The interference amount measurement apparatus 200 may include a transceiver 310 configured to transmit or receive a signal to or from a neighboring cell base station, a terminal, or a device, and a controller 320 configured to control all operations of the interference amount measurement apparatus 200. It can be noted that all techniques or all methods performed by the interference amount measurement apparatus 200 described above with reference to FIG. 2 are performed by the controller 320. It goes without saying that the controller 320 and the transceiver 310 do not have to be implemented as separate devices and may be implemented as one constituent element in the form of, for example, a single chip.

Figure 4:
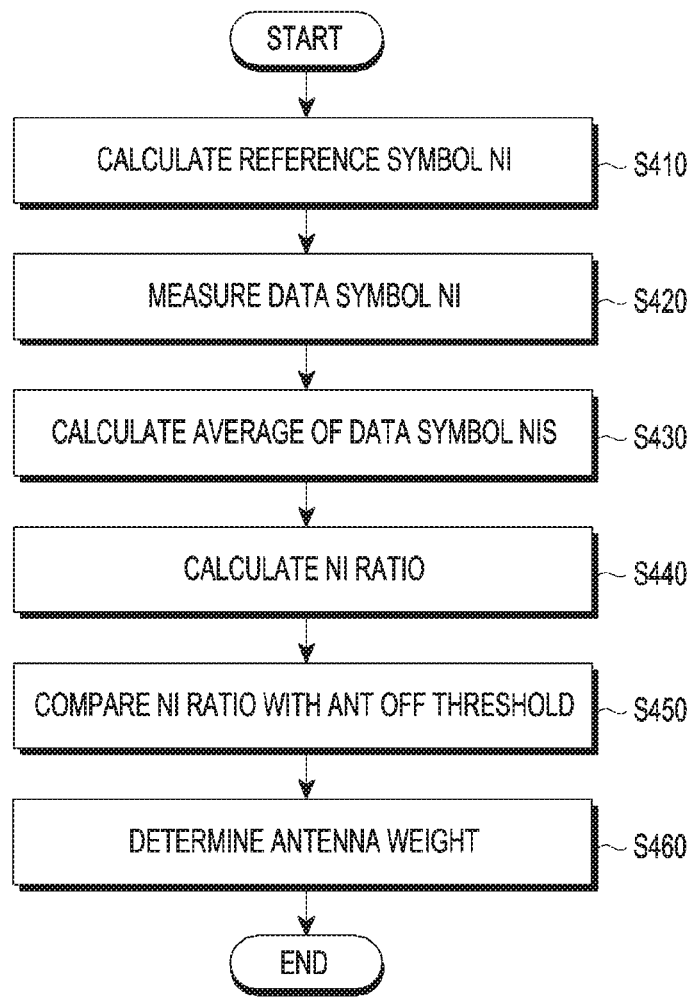
FIG. 4 is a chart illustrating, with the passage of time, a method for measuring an interference amount according to an embodiment of the disclosure.

FIG. 4 is a chart illustrating, with the passage of time, a method for measuring an interference amount according to an embodiment of the disclosure.

First, according to an embodiment of the disclosure, in operation S410, a reference symbol NI may be calculated.

The reference symbol NI may be calculated by measuring NI in a reference symbol of each antenna. The reference symbol NI may also be calculated as an average value of the one or more measured reference symbol NIs.

Similarly, in operation S420, NIs are measured in one or more data symbols of each antenna.

According to an embodiment of the disclosure, in operation S430, n data symbol NI values may be calculated in descending order of magnitudes among the NIs in the one or more respective data symbols, and thus an average of the n data symbol NI values may be calculated.

In operation S440, an NI ratio of each antenna may be calculated based on the calculated reference symbol NI and data symbol NI.

The NI ratio of each antenna is a ratio of a data symbol NI relative to a reference symbol NI, and an NI ratio may be calculated for each antenna, or may be calculated for each data symbol in each antenna.

In operation S450, the NI ratio calculated in operation S440 may be compared with a preset Ant off threshold, and thus, in operation S460, an antenna weight may be determined.

Determination of an antenna weight in operation S460 may be determination of an antenna weight of each antenna for execution of antenna combining, or may be determination of only whether to operate each antenna in an on/off-state.

Further, the determination of an antenna weight may be made for each antenna, or may be made for each of one or more data symbols in each antenna.

Figure 5:
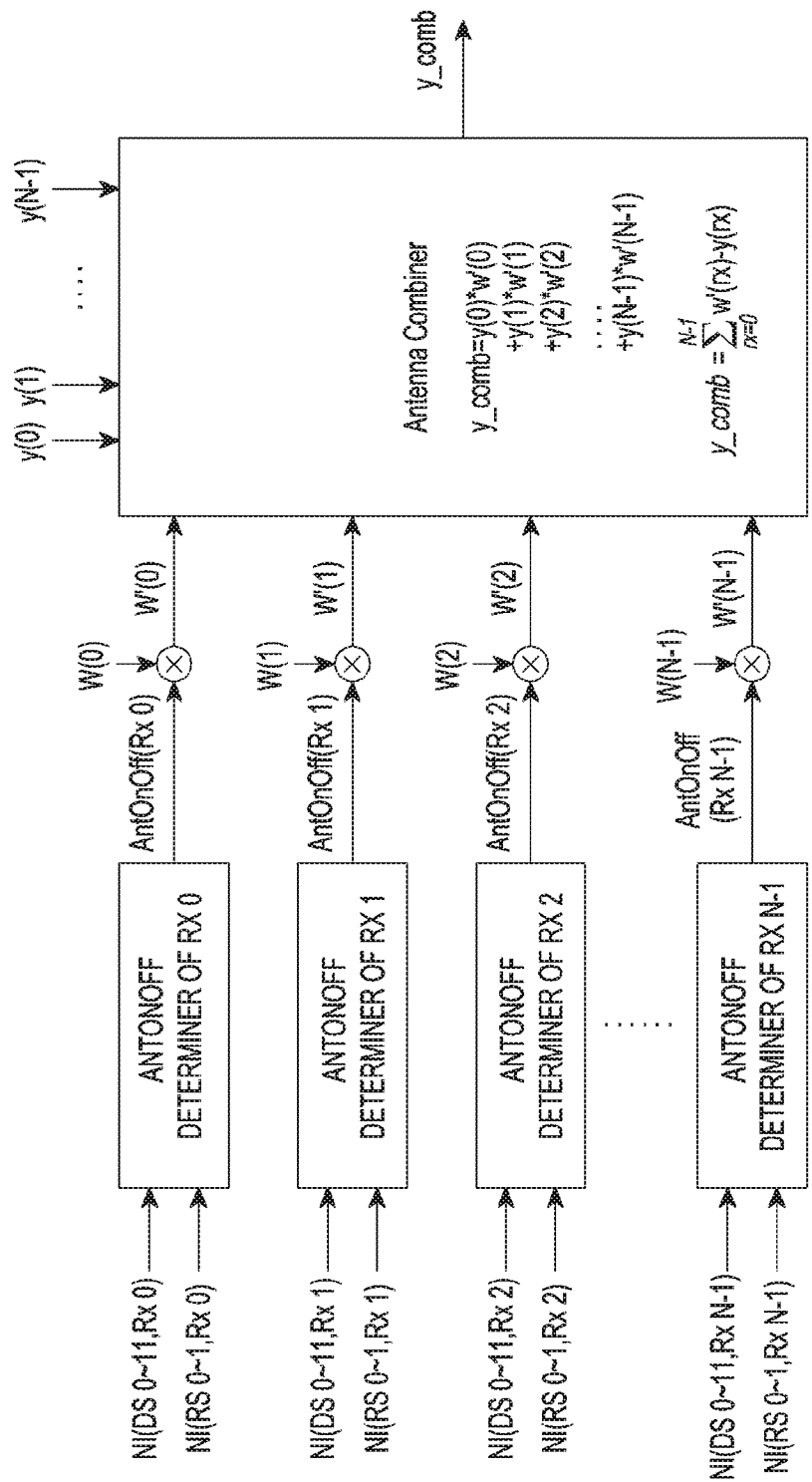
FIG. 5 is a diagram schematically illustrating antenna combining using an interference amount measurement apparatus according to an embodiment of the disclosure.

FIG. 5 is a diagram schematically illustrating antenna combining using an interference amount measurement apparatus according to an embodiment of the disclosure.

FIG. 5 illustrates an embodiment of combining of N antennas utilizing an interference amount measurement apparatus according to an embodiment of the disclosure.

Referring to FIG. 5, y(k) of FIG. 5 represents received signal power of a k-th antenna, and w(k) represents an antenna weight applied to the k-th antenna.

According to an embodiment of the disclosure, in performing antenna combining, a weight (i.e., w(k)) of each antenna may be determined according to a value calculated by the interference amount measurement apparatus.

The interference amount measurement apparatus according to an embodiment of the disclosure determines w(k) of each antenna based on an NI ratio of a data symbol NI value to a reference symbol NI value in each antenna, and thus improved performance can be derived in antenna combining.

w(k) of FIG. 5 may represent a weight of each antenna for antenna combining, and the weight of each antenna may signify on/off of each antenna.

It should be noted that the example view of the method, the configuration view of the system, the configuration view of the apparatus, and the like, which are exemplified by FIG. 1 to FIG. 5, are not intended to limit the scope of the disclosure. That is, all the configurations or operations illustrated in FIG. 1 to FIG. 5 should not be construed to be essential elements for implementation of the disclosure, and even though only some elements are included, the disclosure may be implemented without departing from the essence of the disclosure.

The above-described operations may be implemented by providing a memory device storing a corresponding program code to a certain constituent element within an apparatus including a terminal of a communication system. That is, a base station, or a controller of a terminal apparatus may execute the above-described operations by reading and executing the program code stored in the memory device by means of a processor or a Central Processing Unit (CPU).

Various constituent elements, modules, and the like of an apparatus including a terminal described in the specification may be operated using: a hardware circuit (e.g., a Complementary Metal Oxide Semiconductor (CMOS)-based logic circuit); firmware; software; and/or a hardware circuit, such as a combination of hardware, firmware, and/or software embedded in a machine-readable medium. As an example, various electric configurations and methods may be practiced using electric circuits such as transistors, logic gates, and on-demand semiconductors.

Although specific embodiments have been described in the detailed description of the disclosure, modifications and changes may be made thereto without departing from the scope of the disclosure. Therefore, the scope of the disclosure should not be defined as being limited to the embodiments, but should be defined by the appended claims and equivalents thereof.

The invention claimed is:

1. A method for measuring an interference of an antenna, the method comprising:
receiving at least one reference symbol;
calculating a reference symbol Noise Interference (NI) which is NI in the at least one reference symbol of the antenna, based on the at least one reference symbol;
receiving one or more data symbols;
calculating a data symbol NI which is NI in the data symbol of the antenna, based on the one or more data symbols;
calculating an NI ratio of the antenna which is a ratio of the data symbol NI relative to the reference symbol NI; and
determining an antenna weight of the antenna based on the NI ratio.

2. The method of claim 1, wherein the calculating of the data symbol NI comprises:
measuring respective data symbol-specific NIs in the one or more data symbols based on the one or more respective data symbols; and
calculating, as the data symbol NI, an average value of the data symbol-specific NIs in the one or more data symbols.

3. The method of claim 2, wherein the average value of the data symbol-specific NIs corresponds to a value calculated as an average of n data symbol-specific NIs selected in descending order of NI values among the one or more data symbol-specific NIs measured in the one or more data symbols.

4. The method of claim 1, wherein the one or more data symbols are received in an unallocated Resource Block (RB) domain.

5. The method of claim 4, further comprising calculating received signal powers in the unallocated RB domain, in units of frequency tones,
wherein the data symbol NI is calculated based on an average of the received signal powers calculated in units of frequency tones.

6. The method of claim 1, wherein the data symbol NI is measured in a unit of four RBs.

7. The method of claim 1, wherein the NI ratio of the antenna is calculated for each of the one or more data symbols.

8. The method of claim 1, wherein the antenna weight is determined by comparing the calculated NI ratio with a threshold.

9. The method of claim 8, wherein on or off of the antenna is determined based on a result of comparing the calculated NI ratio with the threshold.

10. The method of claim 1, wherein the antenna weight is determined for each of the one or more data symbols.

11. An apparatus for measuring an interference, the apparatus comprising:
a transceiver configured to receive at least one reference symbol and one or more data symbols; and
at least one processor coupled to the transceiver,
the at least one processor is configured to
calculate a reference symbol Noise Interference (NI), which is NI in the at least one reference symbol of an antenna, based on the at least one reference symbol,
calculate a data symbol NI, which is NI in the data symbol of the antenna, based on the one or more data symbols,
calculate an NI ratio of the antenna which is a ratio of the data symbol NI relative to the reference symbol NI, and
determine an antenna weight of the antenna based on the NI ratio.

12. The apparatus of claim 11, wherein the at least one processor is configured to:
measure respective data symbol-specific NIs in the one or more data symbols based on the one or more respective data symbols; and
calculate, as the data symbol NI, an average value of the data symbol-specific NIs in the one or more data symbols.

13. The apparatus of claim 12, wherein the average value of the data symbol-specific NIs corresponds to a value calculated as an average of n data symbol-specific NIs selected in descending order of NI values among the one or more data symbol-specific NIs measured in the one or more data symbols.

14. The apparatus of claim 11, wherein the one or more data symbols are received in an unallocated Resource Block (RB) domain.

15. The apparatus of claim 14, the at least one processor is configured to:
calculate received signal powers in the unallocated RB domain, in units of frequency tones,
wherein the data symbol NI is calculated based on an average of the received signal powers calculated in units of frequency tones.

16. The apparatus of claim 11, wherein the data symbol NI is measured in a unit of four RBs.

17. The apparatus of claim 11, wherein the NI ratio of the antenna is calculated for each of the one or more data symbols.

18. The apparatus of claim 11, wherein the antenna weight is determined by comparing the calculated NI ratio with a threshold.

19. The apparatus of claim 18, wherein on or off of the antenna is determined based on a result of comparing the calculated NI ratio with the threshold.

20. The apparatus of claim 11, wherein the antenna weight is determined for each of the one or more data symbols.

* * * * *